United States Patent
Sapozhnikov et al.

(10) Patent No.: US 9,070,382 B2
(45) Date of Patent: Jun. 30, 2015

(54) SIDE SHIELD PEDESTAL FOR DATA READERS

(71) Applicant: Seagate Technology LLC, Cupertino, CA (US)

(72) Inventors: Victor Boris Sapozhnikov, Minnetonka, MN (US); Mohammed Shariat Ullah Patwari, Eden Prairie, MN (US); Shaun Eric McKinlay, Eden Prairie, MN (US); Eric Walter Singleton, Maple Plain, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/757,375

(22) Filed: Feb. 1, 2013

(65) Prior Publication Data
US 2014/0218825 A1    Aug. 7, 2014

(51) Int. Cl.
*G11B 5/39*      (2006.01)
*G11B 5/11*      (2006.01)
*G11B 5/127*     (2006.01)
*G11B 5/31*      (2006.01)

(52) U.S. Cl.
CPC *G11B 5/11* (2013.01); *G11B 5/398* (2013.01); *G11B 5/3912* (2013.01); *G11B 5/1278* (2013.01); *G11B 5/3116* (2013.01)

(58) Field of Classification Search
CPC ............. G11B 5/398; G11B 5/3932; G11B 2005/3996; G11B 5/11; G11B 5/3903; G11B 5/3116; G11B 5/3913; G11B 5/1278
USPC ....................... 360/319, 324–324.2
See application file for complete search history.

(56) References Cited

U.S. PATENT DOCUMENTS

| | | | |
|---|---|---|---|
| 6,510,030 B1* | 1/2003 | Song et al. | 360/319 |
| 6,738,233 B2 | 5/2004 | Khizroev et al. | |
| 6,943,993 B2 | 9/2005 | Chang et al. | |
| 7,961,437 B2* | 6/2011 | Seagle | 360/319 |
| 7,978,431 B2 | 7/2011 | Han et al. | |
| 8,014,108 B2* | 9/2011 | Shimazawa et al. | 360/319 |
| 8,231,796 B1 | 7/2012 | Li et al. | |
| 8,395,867 B2* | 3/2013 | Dimitrov et al. | 360/319 |
| 8,514,526 B2* | 8/2013 | Ito et al. | 360/319 |
| 8,749,924 B2* | 6/2014 | Dimitrov et al. | 360/320 |
| 8,760,822 B1* | 6/2014 | Li et al. | 360/324.11 |
| 2009/0086380 A1* | 4/2009 | Seagle | 360/319 |
| 2009/0201612 A1* | 8/2009 | Shimazawa et al. | 360/245 |
| 2012/0268846 A1* | 10/2012 | Gadbois et al. | 360/319 |
| 2013/0065084 A1* | 3/2013 | Dimitrov et al. | 428/810 |
| 2013/0069642 A1* | 3/2013 | Sapozhnikov et al. | 324/260 |

* cited by examiner

*Primary Examiner* — Will J Klimowicz
(74) *Attorney, Agent, or Firm* — Hall Estill Attorneys at Law

(57) ABSTRACT

Various embodiments may be generally directed to a magnetic element capable of reading magnetic data bits. Such a magnetic element may have at least a magnetic stack laterally adjacent a side shield and non-magnetic pedestal on an air bearing surface (ABS). The non-magnetic pedestal can be configured to have a greater stripe height from the ABS than the side shield.

19 Claims, 4 Drawing Sheets

SIDE SHIELD PEDESTAL FOR DATA READERS

SUMMARY

Various embodiments are generally directed to a data reader capable of magnetic data bit sensing.

In accordance with some embodiments, a magnetic stack may be laterally adjacent a side shield and non-magnetic pedestal on an air bearing surface (ABS). The non-magnetic pedestal can have a greater stripe height from the ABS than the side shield.

DETAILED DESCRIPTION

As data storage devices push towards larger capacity, faster data storage devices, and greater data reliability, the magnetic operation of various data access component has been stressed. One such data storage element is a magnetic data reader, which can be sensitive to magnetic volatility that magnetic shields are designed to mitigate. However, the physical minimization of magnetic shields has brought shielded magnetic flux in closer proximity to the magnetically responsive portions of the data reader that consequently degrades the magnetic performance and reliability of the data reader. Hence, reduced form factor magnetic shields capable of maintaining magnetic stability while shielding magnetic flux and providing magnetic bias to magnetically sensitive portions of the data reader have been a continued goal for the data storage industry.

Accordingly, a magnetic reader may be configured at least with a magnetic stack positioned laterally adjacent a side shield and non-magnetic pedestal on an air bearing surface (ABS) with the non-magnetic pedestal having a greater stripe height from the ABS than the side shield. The ability to tune the thickness of the pedestal and the stripe height of the side shield provides reduced magnetic field bias on the magnetic stack by decreasing the amount of soft magnetic material in the side shields by making them thinner. As such, the pedestal and side shield can be configured to provide predetermined magnetic bias to the magnetic stack that is balanced against the magnetic stability of the side shield, which allows the magnetic element can be catered to the diverse shielding environments provided by reduced form factor, high data bit density data storage devices.

Figure 1:
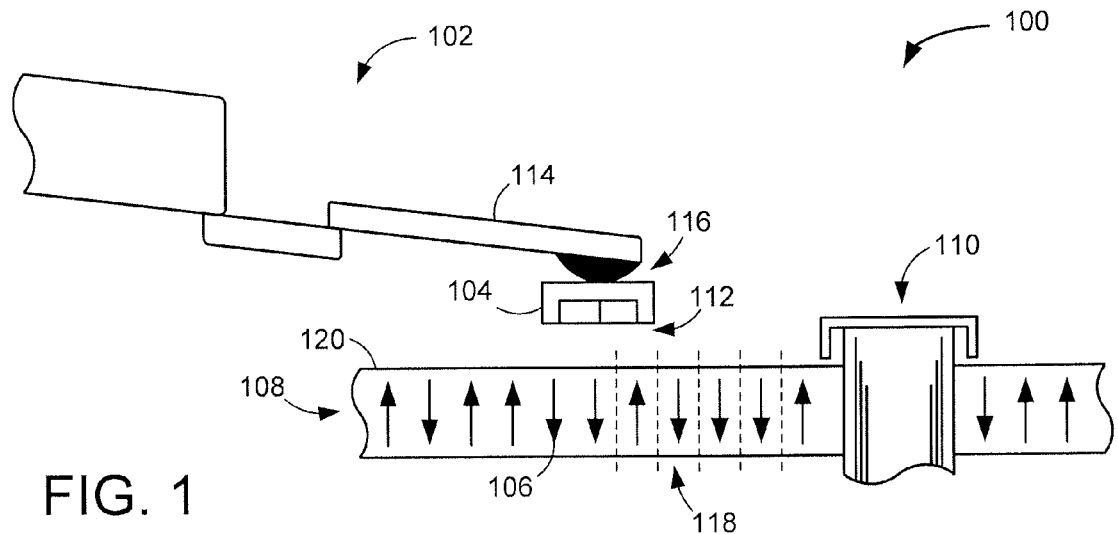
FIG. 1 is a block representation of a portion of an example data storage device in accordance with some embodiments.

FIG. 1 generally provides an exemplary data storage environment in which magnetic shielding can be tuned in accordance with various embodiments. While not required or limiting, the data storage environment has a data transducing portion 100 that is configured with an actuating assembly 102 that positions a transducing head 104 over programmed data bits 106 present on a magnetic storage media 108 that is attached to, and rotates about, a spindle motor 110 to produce an air bearing surface (ABS) 112. The speed in which the spindle motor 110 rotates allows a slider portion 114 of the actuating assembly 102 to fly on the ABS 112 to position a head gimbal assembly (HGA) 116, which includes the transducing head 104, over a desired portion of the media 108.

The transducing head 104 may be constructed with one or more transducing elements, such as a magnetic writer and magnetically responsive reader, which operate to program data to and read data bits 106 from the storage media 108, respectively. In this way, controlled motion of the actuating assembly 102 and spindle motor 110 can modulate the position of the transducing head 104 both laterally along predetermined data tracks 118 defined on the storage media surface 120 and vertically as measured perpendicularly to the media surface 120 across the ABS 112 to selectively write, read, and rewrite data.

Figure 2:
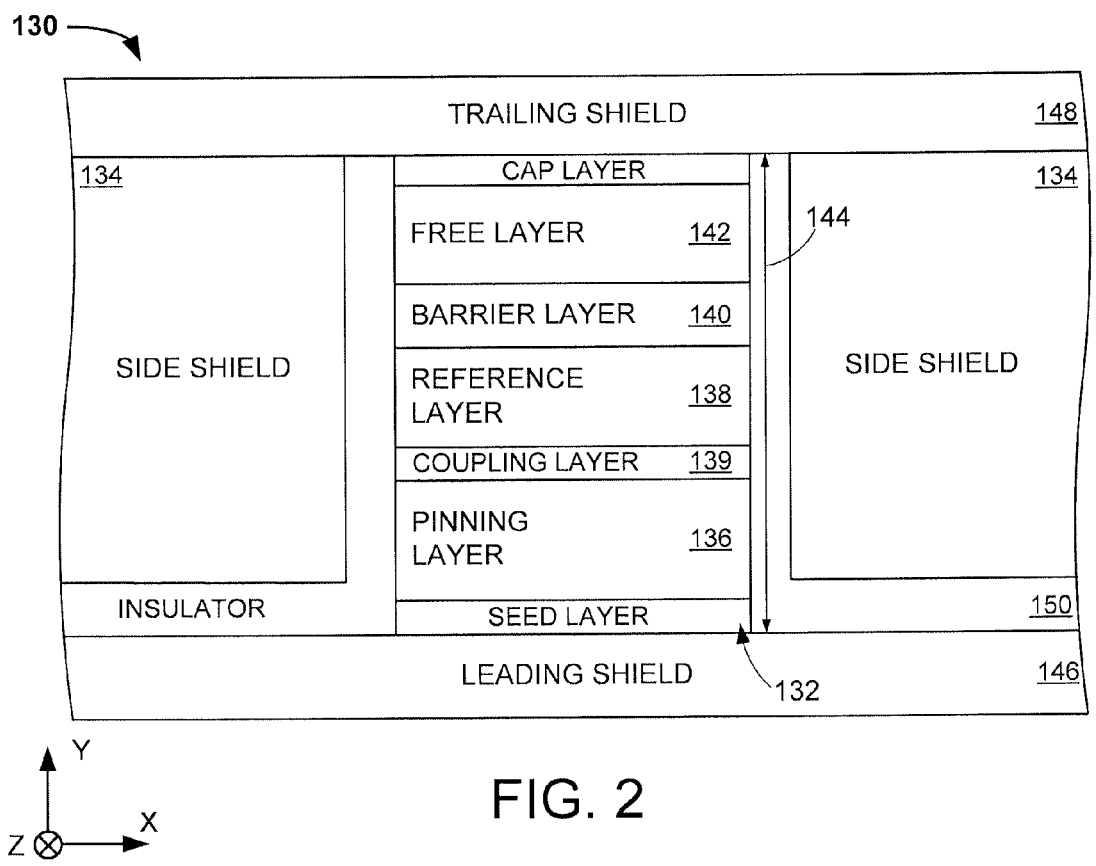
FIG. 2 shows a block representation of a portion of an example magnetic element capable of being used in the data storage device of FIG. 1.

FIG. 2 shows an ABS view block representation of an example magnetic element 130 capable of being used in the transducing portion 100 of a data storage device shown in FIG. 1. The magnetic element 130 may be configured with an unlimited variety of materials, layers, and orientations that are capable of data bit sensing, but in the embodiment shown in FIG. 2, a magnetic stack 132 is disposed between and separated from magnetic side shields 134 on the ABS. The magnetic stack 132 is configured as an abutted junction lamination characterized by a fixed magnetization provided by a pinning layer 136, such as an antiferromagnetic material, contacting a reference layer 138 via a coupling layer 139 that may create a synthetic antiferromagnet with the pinning 136, reference 138, and coupling 139 layers. The reference layer is positioned opposite a barrier layer 140 from a magnetically free layer 142, but the barrier layer 140 may be configured to be a non-magnetic spacer layer in various embodiments.

It should be noted that the term "stack" is an unlimited term within this disclosure that can be one or more vertically and horizontally aligned layers, constructed of magnetic and non-magnetic material that are capable of magnetic reading and writing. Throughout the present application, the term "stack" will be understood to mean a component that is constructed to respond to external data bits to provide access to external data bits in any operational environment. For example, but not in any way limiting, a magnetic stack may be a data read or write configuration that can differentiate between a plurality of data bits.

In some embodiments, the magnetic stack 132 can be constructed as a trilayer lamination that has no fixed magnetization, but instead two magnetically free layers biased to a default magnetization by an external biasing structure, such as a rear bias magnet or the side shields 134. Regardless of the configuration of the magnetic stack 132, the emphasis on reducing the shield-to-shield spacing 144 between the leading 146 and trailing 148 shields has reduced the thickness of the insulator layer 150 that buffers shielded magnetic flux in the side shields 134 from inadvertently influencing the magnetic stack 132. Specifically, the presence of soft magnetic side shield 134 materials, like NiFe, can saturate with shielded magnetic fields that can rotate abruptly and in directions opposed to the sensed magnetization of the stack free layer 142, which can lead to data reading errors and increased magnetic element 130 latency.

Figure 3:
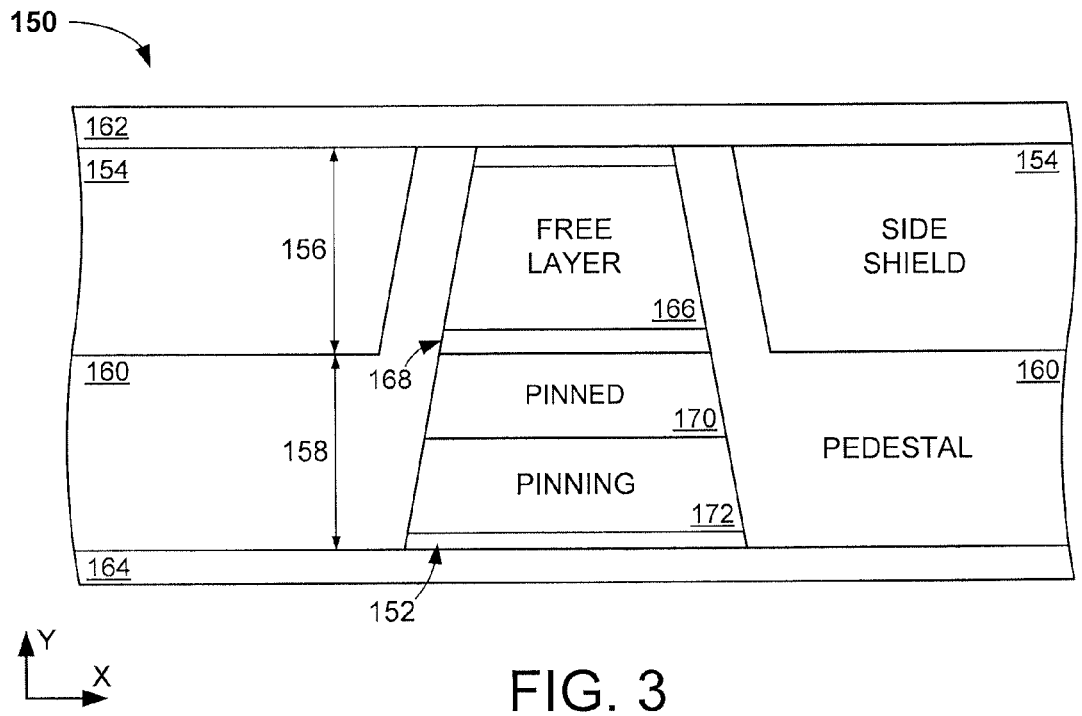
FIG. 3 displays an ABS view block representation of a portion of an example data reader tuned in accordance with various embodiments.

With these operational challenges in mind, the amount of soft magnetic material in the side shields 134 can be minimized to provide a balance between magnetic shielding, magnetic stack bias magnitude, and magnetic element 130 stability. FIG. 3 displays an ABS view block representation of a portion of an example magnetic reader 150 tuned in accordance with some embodiments to provide enough magnetic stack bias with magnetically stable shielding. As shown, each lateral side shield 154 has a thickness 156 that is reduced compared to the side shield 134 of FIG. 2 by the thickness 158 of a non-magnetic pedestal 160.

The respective thicknesses 156 and 158 of the side shield 154 and pedestal 160 can be tuned so that magnetic material continuously extends from a trailing shield 162 towards the leading shield 164. Various embodiments extend the side shield thickness 156 to be greater than the thickness of the magnetically free layer 166 of the magnetic stack 152, but less than the aggregate thickness of the free layer 166 and barrier layer 168 from the trailing shield 162. The side shields 154 can be configured in other embodiments to continuously extend beyond the barrier layer 168 to be laterally adjacent the pinned 170 and pinning 172 layers of the magnetic stack 152.

The variable thickness of the side shields 154, and consequently the non-magnetic pedestal 160, provides the ability to have more, or less, magnetic bias magnetization provided to the magnetic stack 152 at the ABS. With the side shield thickness 156 shown in FIG. 3 that extends to no farther than the barrier layer 168, the soft magnetic material of the side shields 154 are positioned to shield magnetic flux from the magnetically sensitive free layer 166 while providing magnetic bias primarily to the free layer 166. Along those lines, the tuned side shield thickness 156 can, in some embodiments, correspond with a heightened pinning layer 172 thickness and magnetic strength to fend off errant magnetic fields present due to lack of shielding material below the barrier layer 168.

Figure 4:
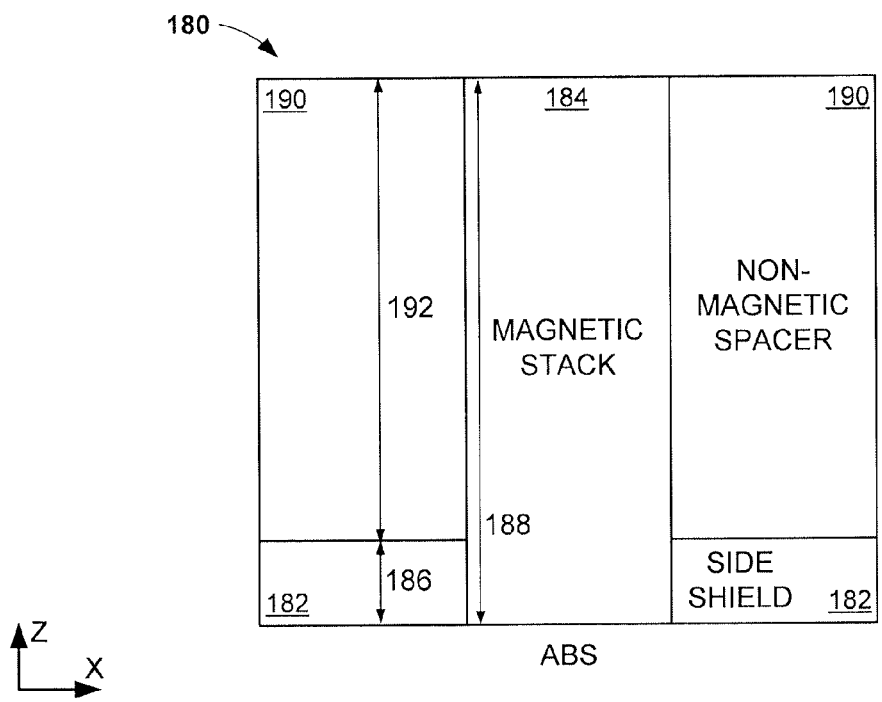
FIG. 4 illustrates a top view block representation of an example magnetic element configured in accordance with some embodiments.

The tuning of the side shields 154 and pedestal 160 is not limited to their respective configurations at the ABS. FIG. 4 is a top view block representation of a magnetic element 180 that illustrates how the stripe heights of the magnetic shields 182 and magnetic stack 184 can be tuned in accordance with various embodiments. The top view of FIG. 4 shows how soft magnetic material of the side shield 182 can be replaced with non-magnetic spacers 190 that fill in the difference between the stripe heights 186 and 188, as measured from the ABS along the Z axis, of the side shield 182 and magnetic stack 184. That is, the non-magnetic material of the pedestal present on the ABS can continuously or discontinuously extend from the ABS to behind the side shields 182 to localize the soft magnetic material of the side shields 182 to the ABS.

With the soft magnetic side shields 182 being minimized about the ABS and the free layer of the magnetic stack, as displayed in FIG. 3, the chance of shielded magnetic fields adversely influencing data sensing operation in the magnetic stack 184 is greatly reduced. However, such minimal shielding may not adequately define the magnetic extent of the magnetic stack 184 to be able to reliably read individual data bits, especially data bits densely packed into a high areal density. In other words, the minimal side shields 182 in FIG. 4 may not be enough to prevent the magnetic stack 184 from inadvertently sensing data bits from adjacent data tracks, which can result in increased noise and reduced magnetoresistive ratio for the magnetic stack 184.

Figure 5:
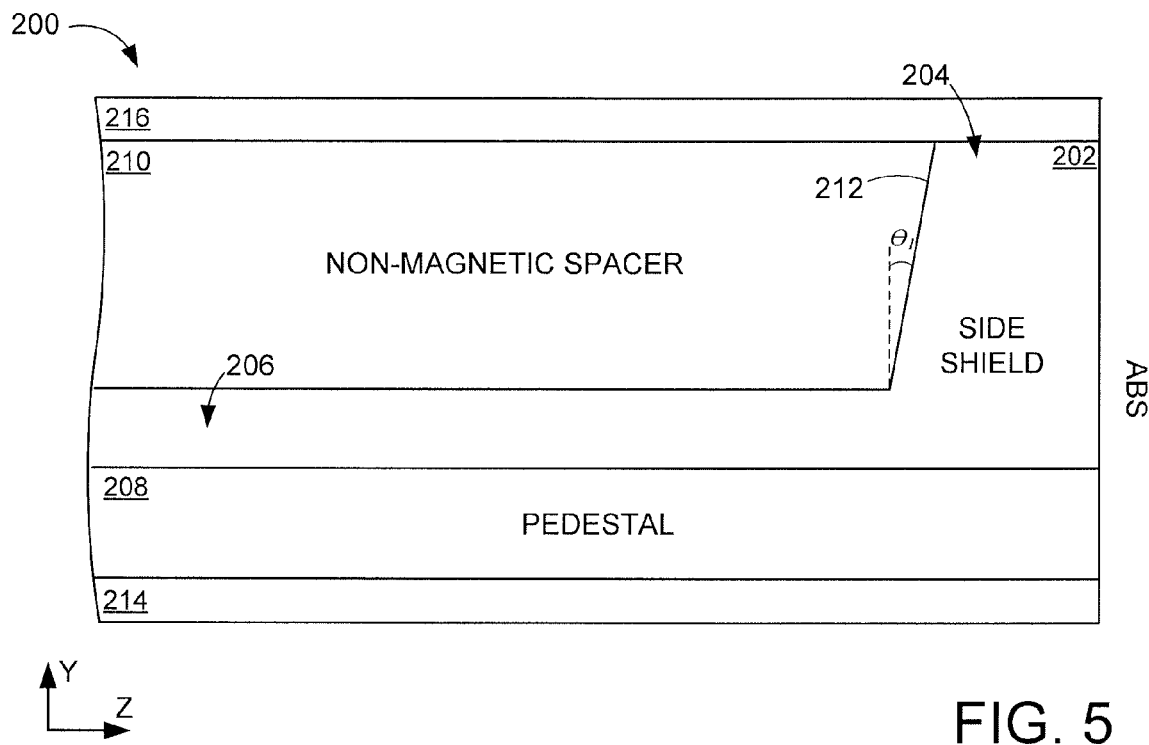
FIG. 5 shows a cross-section of an example data reader constructed in accordance with various embodiments.

FIG. 5 is a cross-sectional block representation of an example data reader 200 tuned in accordance with some embodiments to reduce the amount of soft magnetic material proximal the magnetically sensitive portions of the data reader 200 while providing an increased level of magnetic shielding compared to the configuration of element 180 of FIG. 4. The side shield 202 is configured with a head portion 204 at the ABS and a tail portion 206 continuously extending from the head portion 204 along the Z axis. The head 204 and tail 206 portions can be respectively tuned for thickness to provide a balance between magnetic bias being provided to the adjacent magnetic stack and side shield 202 stabilization.

In comparison to the tuned magnetic element 180 of FIG. 4 where the side shields 182 extended no farther than stripe height 186, configuring the side shield 202 with the increased thickness head portion 204 at the ABS and the reduced thickness tail portion distal to the ABS allows for magnetic shielding along some, or all, of the stripe height of the magnetic stack while decreasing the risk that the tail portion will saturate and inadvertently influence operation of the adjacent magnetic stack. The reduced thickness of the tail portion 204 along the Y axis, parallel to the ABS, further allows the side shield 202 to be buffered by an increased amount of non-magnetic material as the non-magnetic pedestal 208 and non-magnetic spacer 210 contact the side shield 202 on opposite sides. The reduced thickness of the tail portion 204 may also exert less magnetic torque on the magnetic stack, particularly the reference layer, to make the magnetic stack more stable and provide optimized magnetic asymmetry operation.

Just as the tail portion 206 of the side shield 202 can be uniquely tuned, the head portion 204 may be tuned with a shaped rear wall 212, distal the ABS, that can allow for more efficient flow of magnetization between the head 202 and tail 204 portions. That is, the rear wall 212 can be tuned with an unlimited variety of shapes, such as the linear surface tapered at a predetermined angle $\theta_1$ or a continuously curvilinear surface, to minimize the amount of magnetic domains in the side shield 202 and reduce the chance that retained magnetization in the side shield 202 can influence the magnetic stack.

With the moderate and tuned increase in magnetic material in data reader 200, along with leading 214 and trailing 216 shields, magnetic stabilization can be more robust in the face of heightened levels of magnetic flux present in modern, high data bit density data storage devices. The ability to tune the shape, stripe height, and thickness of the pedestal 208 and side shield 202 can allow for considerably different magnetic shielding characteristics that can be conducive to a wide variety of different data storage environments.

Figure 6:
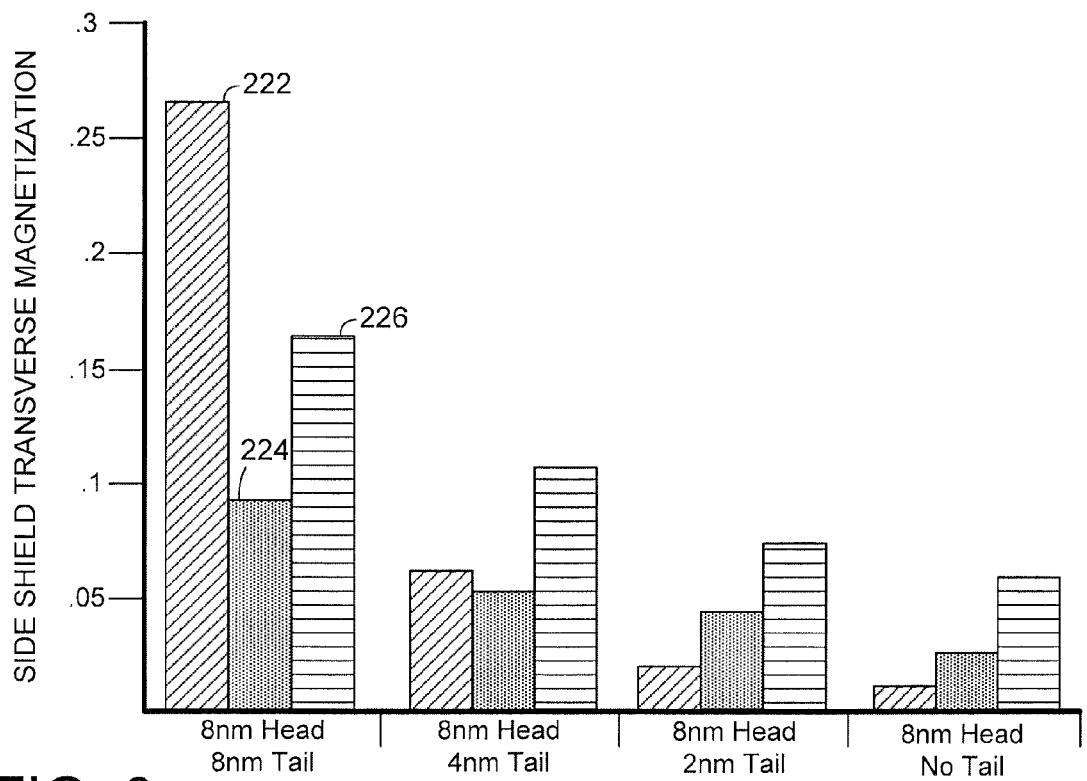
FIG. 6 plots operational data for a variety of example magnetic readers each tuned in accordance with some embodiments.

FIG. 6 plots operational data from example data readers tuned with different side shield head and tail portion thicknesses at the ABS. The first cross-hatching shown in column 222 and found for each different data reader configurations, corresponds with the Y axis aligned magnetization of the side shield in the presence of zero magnetic field along the Y axis. The second cross-hatching of column 224 and the other data reader configurations illustrates the Y axis aligned magnetization amplitude for the side shield. Finally, the third cross-hatching found in each data reader configuration and specifically column 226 shows the derivative Y axis magnetization amplitude for the side shield.

As can be appreciated from the different transverse magnetization readings for the respective head and tail portion thicknesses, a thicker tail portion corresponds with greater transverse magnetization that may be attributed to the increased amount of soft magnetic material adjacent the magnetic stack. In contrast, tuning the tail portion of the side shield to be thinner, or eliminated, can provide different, but optimized data reader static and dynamic metrics that support the balance of magnetic shielding with magnetic stability.

Figure 7:
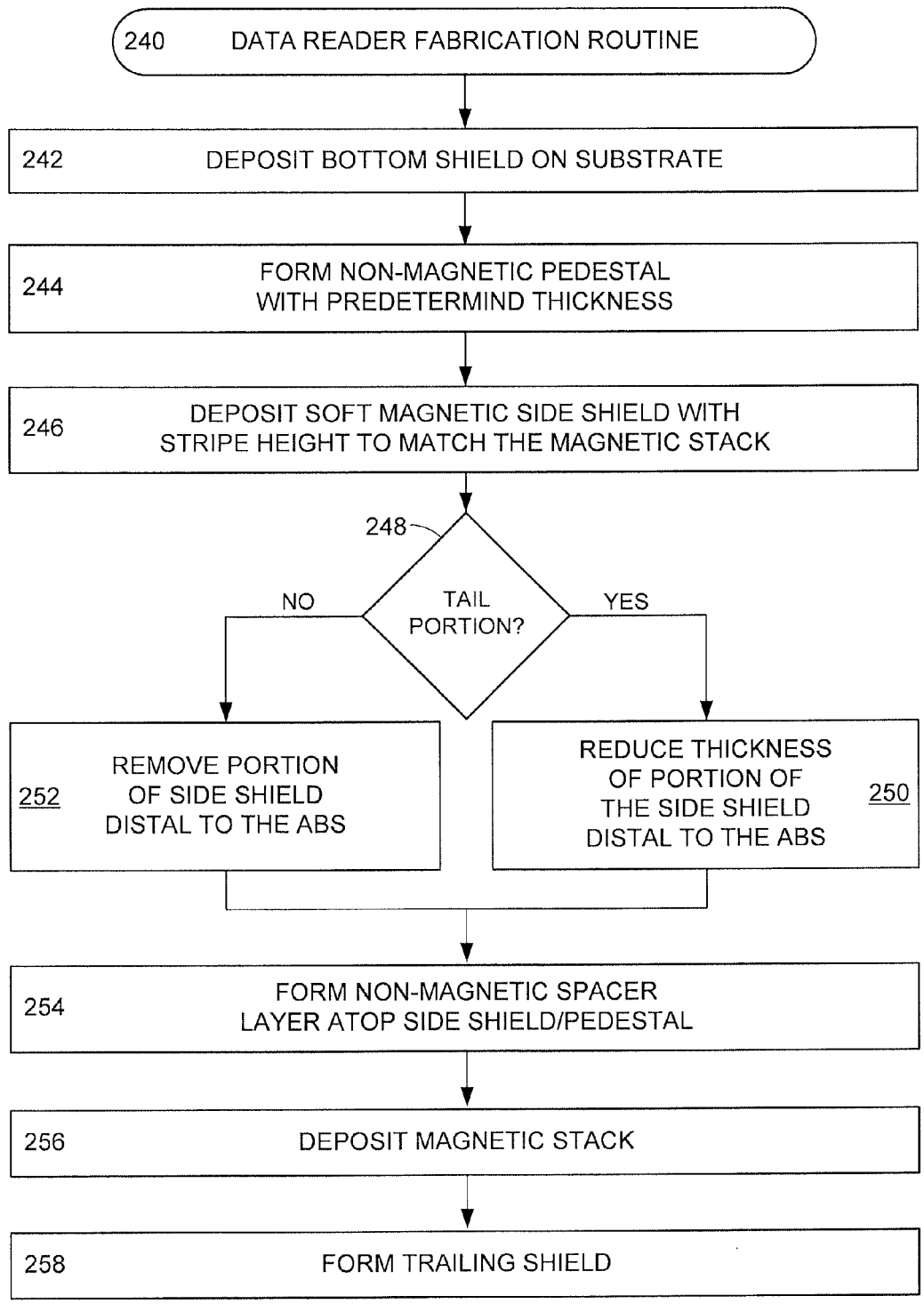
FIG. 7 provides a flowchart of a data reader fabrication routine carried out in accordance with various embodiments.

FIG. 7 provides an example flowchart of a data reader fabrication routine 240 that maps how a magnetic element can be tuned in accordance with various embodiments. The routine 240 may begin with the deposition of a leading shield on a substrate in step 242. Next, step 244 forms a non-magnetic pedestal with a predetermined thickness on the bottom shield. The pedestal may be configured as a single layer, such as Ta, Ru, or AlO, or as a lamination of similar or dissimilar materials. The formation of the non-magnetic pedestal is followed by step 246 where a soft magnetic side shield is deposited with a stripe height to match the magnetic stack, regardless of whether the magnetic stack has been formed yet or not.

With the side shield extending the full stripe height of the data reader with a continuous and uniform predetermined thickness, decision 248 evaluates and determines if the side shield is to have a tail portion, such as the tail 206 shown in FIG. 5. If indeed a tail portion is to be constructed, step 250 reduces the thickness of a predetermined portion of the side shield, distal the ABS. In some embodiments, step 250 further shapes a rear wall of the head portion of the side shield. A determination in decision 248 that no tail portion is desired advances routine 240 to step 252 where a predetermined amount of the side shield stripe height distal to the ABS is removed. Similarly to step 250, step 252 may also shape a rear wall of the remaining side shield during or after the removal of the side shield material.

Step 254 then forms a non-magnetic spacer layer atop the side shield in the event a tail portion is present or atop the pedestal if the side shield is localized to the ABS. The non-magnetic spacer layer may be formed of an unlimited variety of materials, such as Ta and AlO, with any deposition process, such as sputtering, atomic layer deposition, and vapor deposition. The completion of the side shields with step 254 can be immediately followed by step 256 where the magnetic stack is deposited between the side shields. As can be appreciated, the magnetic stack can comprise a number of different layers, deposition techniques, and materials, such as with abutted junction and trilayer laminations.

The routine may conclude with step 258, which forms a trailing shield that continuously spans each side shield, non-magnetic spacer layer, and the magnetic stack to finalize the data reader. With the ability to tune the various side shield and pedestal layers, the magnetic operation of the magnetic stack can be optimized for a variety of data storage environments. The routine 240, however, is not limited only to the steps and decisions provided in FIG. 7 as any number of steps can be added, omitted, and modified to accommodate the fabrication of a precisely tuned magnetic reader. For instance, the deposition of the magnetic stack can be conducted prior to step 244 or conducted concurrently with some or all of the deposition of the side shields.

It can be appreciated that a tuned side shield and non-magnetic pedestal configuration can provide diverse balance between magnetic stabilization and shielding of a magnetic stack. Through the tuning of the thickness, stripe height, and material of the pedestal and side shield, a variety of magnetic stack operating parameters can be optimized. Moreover, the ability to tune the side shield to have a tail portion that extends to match the stripe height of the magnetic stack with a reduced thickness can be tuned to minimize the amount of soft magnetic material proximal the magnetic stack while providing reliable magnetic shielding in reduced form factor, high data bit density data storage environments. Additionally, while the embodiments have been directed to magnetic sensing, it will be appreciated that the claimed invention can readily be utilized in any number of other applications, including data storage device applications.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. A data reader comprising a magnetic stack having a free layer laterally adjacent a side shield and non-magnetic pedestal, the side shield and non-magnetic pedestal each positioned on an air bearing surface (ABS), the magnetic stack including the free layer having a first stripe height, the side shield having a second stripe height, and the non-magnetic pedestal having a third stripe height, the first, second, and third stripe heights each measured from the ABS, the second stripe height being smaller than the first and third stripe heights, the non-magnetic pedestal continuously extends from the second stripe height to the first stripe height, the first and third stripe heights being the same.

2. The data reader of claim 1, wherein the magnetic stack comprises an abutted junction lamination characterized by a fixed magnetization producing structure.

3. The data reader of claim 1, wherein the side shield continuously extends from a trailing shield to a position on the ABS no farther than a barrier layer of the magnetic stack.

4. The data reader of claim 1, wherein the side shield is positioned laterally adjacent the free layer of the magnetic stack.

5. The data reader of claim 1, wherein a non-magnetic spacer portion of the non-magnetic pedestal contacts the side shield distal the ABS.

6. The data reader of claim 5, wherein the non-magnetic spacer portion continuously extends from the second stripe height to the third stripe height.

7. The data reader of claim 1, wherein the pedestal comprises a single continuous layer of non-magnetic material.

8. The data reader of claim 7, wherein the non-magnetic material comprises AlO.

9. The data reader of claim 7, wherein the single continuous layer extends to separate the side shield from the magnetic stack on the ABS.

10. An apparatus comprising a magnetic stack having a free layer laterally adjacent a side shield and non-magnetic pedestal, the side shield and non-magnetic pedestal each positioned on an air bearing surface (ABS), the magnetic stack including the free layer and non-magnetic pedestal respectively having first and second stripe heights each measured from the ABS, the side shield having a first portion with a third stripe height from the ABS and a second portion with a fourth stripe height from the ABS, the third stripe height being smaller than the first, second and fourth stripe heights, the second and fourth stripe heights being the same, the non-magnetic pedestal continuously extends from the third stripe height to the first stripe height, the first and second stripe heights being the same.

11. The apparatus of claim 10, wherein the first portion of the side shield has a greater thickness than the second portion of the side shield, as measured parallel to the ABS.

12. The apparatus of claim 10, wherein the first portion of the side shield has a shaped rear wall defining a transition from a first thickness to a second thickness.

13. The apparatus of claim 12, wherein the rear wall is tapered at a predetermined angle.

14. The apparatus of claim 12, wherein a non-magnetic spacer contacts both the first and second portions of the side shield and has a third thickness that is the difference between the first and second thicknesses.

15. The apparatus of claim 10, wherein the first portion of the side shield is positioned on the ABS and the second portion of the side shield is positioned distal to the ABS.

16. The apparatus of claim 10, wherein the second portion of the side shield has a uniform thickness as measured parallel to the ABS.

17. The apparatus of claim 10, wherein the aggregate of the third and fourth stripe heights equal the second stripe height.

18. A magnetic element comprising a magnetic stack having a free layer laterally adjacent a side shield, the side shield positioned atop a non-magnetic pedestal, the side shield and non-magnetic pedestal each positioned on an air bearing surface (ABS), the magnetic stack, including the free layer side shield, and non-magnetic pedestal respectively having first, second, and third stripe heights each measured from the ABS, the side shield having a first portion with a first thickness at the ABS that is greater than a second thickness of a second portion of the side shield distal the ABS, the second stripe height being smaller than the first and third stripe heights, the non-magnetic pedestal continuously extends from the second stripe height to the first stripe height, the first and third stripe heights being the same.

19. The magnetic element of claim 18, wherein the first thickness is at least twice the second thickness.

* * * * *